US012593216B2

(12) United States Patent
Narula et al.

(10) Patent No.: US 12,593,216 B2
(45) Date of Patent: Mar. 31, 2026

(54) MANAGED AUTOMATIC PAIRING

(71) Applicant: Dell Products, L.P., Round Rock, TX (US)

(72) Inventors: Harpreet Narula, Austin, TX (US); Kameel Ashok Vohra, Singapore (SG)

(73) Assignee: Dell Products L.P., Round Rock, TX (US)

( * ) Notice: Subject to any disclaimer, the term of this patent is extended or adjusted under 35 U.S.C. 154(b) by 316 days.

(21) Appl. No.: 18/337,105

(22) Filed: Jun. 19, 2023

(65) Prior Publication Data

US 2024/0422548 A1    Dec. 19, 2024

(51) Int. Cl.
*H04W 12/50*      (2021.01)
*H04W 4/80*       (2018.01)

(52) U.S. Cl.
CPC ............. *H04W 12/50* (2021.01); *H04W 4/80* (2018.02)

(58) Field of Classification Search
CPC ................................ H04W 12/50; H04W 4/80
See application file for complete search history.

(56) References Cited

U.S. PATENT DOCUMENTS

| | | | | |
|---|---|---|---|---|
| 10,862,896 | B2 * | 12/2020 | Kockan ................. | H04W 12/50 |
| 2013/0232242 | A1 * | 9/2013 | Millington .............. | H04L 12/28 |
| | | | | 709/225 |

| | | | | |
|---|---|---|---|---|
| 2015/0081474 | A1 * | 3/2015 | Kostka ................. | H04W 88/08 |
| | | | | 705/26.8 |
| 2016/0095080 | A1 * | 3/2016 | Khoryaev ............. | G01S 5/0284 |
| | | | | 455/456.1 |
| 2016/0295605 | A1 * | 10/2016 | Walline ................. | H04W 12/06 |
| 2017/0041304 | A1 * | 2/2017 | Tal ...................... | H04L 41/0886 |
| 2019/0037346 | A1 * | 1/2019 | Drake ............... | H04M 1/72412 |
| 2019/0182662 | A1 * | 6/2019 | Carlson .............. | G06Q 20/3278 |
| 2020/0322917 | A1 * | 10/2020 | Rosenberg .......... | H04W 64/003 |
| 2020/0396517 | A1 * | 12/2020 | Hodge ............... | H04N 21/4223 |
| 2021/0160937 | A1 * | 5/2021 | Khanduri ................ | H04W 4/80 |
| 2022/0030403 | A1 * | 1/2022 | Peng ...................... | H04W 76/11 |
| 2023/0096178 | A1 * | 3/2023 | Wu ........................ | H04W 72/51 |
| | | | | 370/329 |

* cited by examiner

*Primary Examiner* — Nizar N Sivji

(74) *Attorney, Agent, or Firm* — Fogarty LLP

(57)                    ABSTRACT

In (IT) managed automatic paring, short-range wireless (e.g., Bluetooth®) (peripheral) devices are configured to add an advertisement packet to a short-range wireless device advertisement. A managing Information Handling System (IHS) detects and parses out the advertisement packet from the advertisement, pairs with the device, generates a short-range wireless device identifier using the advertisement packet, stores the device identifier on the managing IHS and the device to establish a device pair identity for the device, and transfers the device identifier to a target IHS to assign the device to the target IHS and provision the target IHS to automatically pair with the device. The managing IHS may then delete resulting pairing information. The target IHS may detect and parse out the advertisement packet from the advertisement, confirm that the target IHS is provisioned to automatically pair with the device, request a pairing passkey, and initiate secure pairing with the device.

19 Claims, 5 Drawing Sheets

```
STATIC CONST STRUCT BT_DATA PAIR_AD_PREPARE[] = {
    BT_DATA_BYTES(BT_DATA_FLAGS, (BT_LE_AD_GENERAL |
BT_LE_AD_NO_BREDR)),
    BT_DATA_BYTES(BT_DATA_UUID16_ALL,
        0X12, 0X18, /* HID SERVICE */
    ),
    BT_DATA_BYTES(BT_DATA_GAP_APPEARANCE, 0XC2, 0X03)
    BT_DATA_BYTES(BT_DATA_MANUFACTURER_DATA, 0X1E, 0X04,   /* SIG ID
*/
        0X38,  /* PAIR ID */
        0X02,  /* API VERSION */
        0X0A,  0X25, /* PID */
        0X01,  /* PREPARING SUPPORTED*/
        0X01, 0X02,0X03, 0X04,0X05, 0X06,0X07, 0X08),  /* DEVICE ID
8 BYTES GENERATED RANDOM AND STORED IN FLASH FOR DEVICE
LIFETIME */
};
```

MANAGED AUTOMATIC PAIRING

FIELD

This disclosure relates generally to Information Handling Systems (IHSs), more specifically, to managed automatic paring, and particularly, to Information Technology (IT) managed automatic paring.

BACKGROUND

As the value and use of information continues to increase, individuals and businesses seek additional ways to process and store information. One option available to users is Information Handling Systems (IHSs). An IHS generally processes, compiles, stores, and/or communicates information or data for business, personal, or other purposes thereby allowing users to take advantage of the value of the information. Because technology and information handling needs and requirements vary between different users or applications, IHSs may also vary regarding what information is handled, how the information is handled, how much information is processed, stored, or communicated, and how quickly and efficiently the information may be processed, stored, or communicated. The variations in IHSs allow for IHSs to be general or configured for a specific user or specific use such as financial transaction processing, airline reservations, enterprise data storage, or global communications. In addition, IHSs may include a variety of hardware and software components that may be configured to process, store, and communicate information and may include one or more computer systems, data storage systems, and networking systems.

Short-range wireless technology (e.g., Bluetooth®) devices (i.e., Wireless Personal Area Network (WPAN)) are increasingly prevalent. With technologies such as Radio Frequency (RF) tag pairing, proximity pairing, and zero-click pairing, it is increasingly likely for short-range wireless peripherals to be quickly and unknowingly connected to client devices. Current methods for short-range wireless technology management require short-range wireless technology to be disabled in BIOS at the factory level, or for short-range wireless Operating System (OS) capability to be blocked through management software, (e.g., Microsoft® InTune). These solutions do not allow users to use any short-range wireless peripherals using the restricted protocol, even if the short-range wireless peripheral is trusted and/or approved by Information Technology (IT) administrators. There is no mechanism to allow only approved, or limited, short-range wireless peripherals to be connected to client devices.

SUMMARY

Embodiments of (Information Technology (IT)) managed automatic paring are described. In an illustrative, non-limiting example short-range wireless (e.g., Bluetooth®) (peripheral) devices are configured to add an advertisement packet to a short-range wireless device advertisement. The advertisement packet may be unique and/or random generated by a random number generator of the short-range wireless device. Also, the short-range wireless device may include an indicator of the advertisement packet in an extended advertisement indicator and add the advertisement packet to extended auxiliary advertisement protocol data unit packets.

A managing Information Handling System (IHS) detects and parses out the advertisement packet from the short-range wireless device advertisement, pairs with the short-range wireless device to establish a secure link with the short-range wireless device, generates a short-range wireless device identifier using the advertisement packet, stores the device identifier on the managing IHS and the short-range wireless device to establish a device pair identity for the short-range wireless device, and transfers the device identifier to a target IHS to assign the short-range wireless device to the target IHS and provision the target IHS to automatically pair with the short-range wireless device. The managing IHS may then delete resulting pairing information from the managing IHS. Generating the short-range wireless device identifier using the advertisement packet may include generating the short-range wireless device identifier using entropy of the advertisement packet. The foregoing may be carried out by an Information Technology Decision Maker (ITDM) filter driver service on the managing IHS.

Then, (initially) the target IHS may detect and parse out the advertisement packet from the short-range wireless device advertisement, confirm that the target IHS is provisioned to automatically pair with the short-range wireless device, request a pairing passkey, and initiate secure pairing with the short-range wireless device upon receipt of the passkey. The foregoing may be carried out by a client filter driver service on the target IHS. This target IHS may be a personal IHS (PC) or a wireless docking station.

BRIEF DESCRIPTION OF THE DRAWINGS

The present invention(s) is/are illustrated by way of example and is/are not limited by the accompanying figures, in which like references indicate similar elements. Elements in the figures are illustrated for simplicity and clarity and have not necessarily been drawn to scale.

FIG. 5 is an example of an advertisement format used in managed automatic paring, according to some embodiments.

DETAILED DESCRIPTION

For purposes of this disclosure, an Information Handling System (IHS) may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an IHS may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The IHS may include random access memory (RAM), one or more processing resources such as a central processing unit (CPU) or hardware or software control logic, ROM, and/or other types of nonvolatile memory. Additional components of the IHS may include one or more disk drives, one or more network ports for communicating with external devices as well as various input and output (I/O) devices, such as a keyboard, a mouse, touchscreen and/or a video display. The IHS may also include one or more buses operable to transmit communications between the various hardware components. A more detailed example of an IHS is described with respect to FIG. 1.

Figure 1:
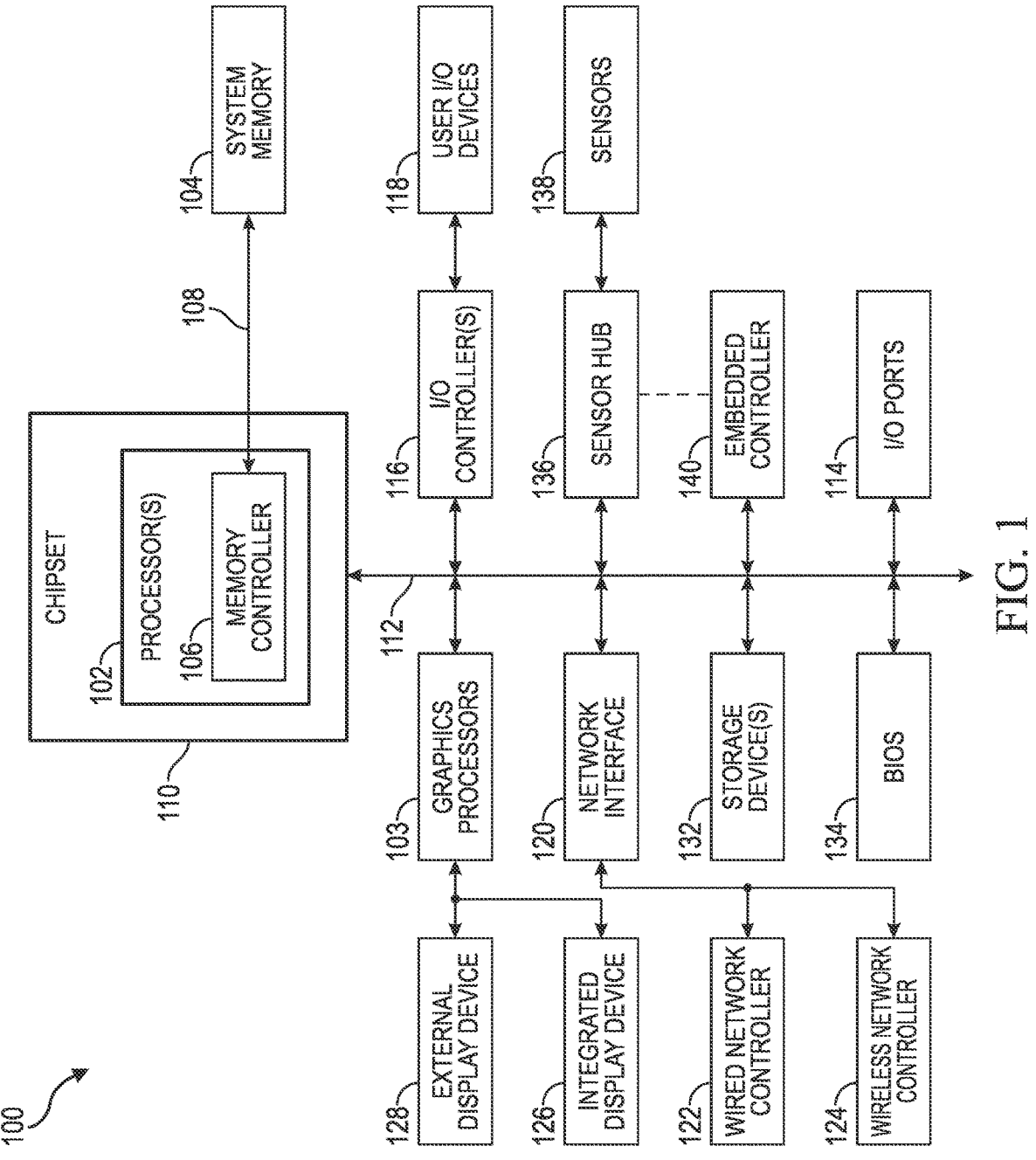
FIG. 1 is a block diagram illustrating components of an example of an Information Handling System (IHS), according to some embodiments.

FIG. 1 is a block diagram of an example of internal components of IHS 100, according to some embodiments. As shown, IHS 100 includes one or more processors 102, such as a Central Processing Unit (CPU), that execute code retrieved from system memory 104. Although IHS 100 is illustrated with a single processor 102, other embodiments may include two or more processors, that may each be configured identically, or to provide specialized processing operations. Processor(s) 102 may include any processor capable of executing instructions, such as an Intel Pentium™ series processor or any general-purpose or embedded processors implementing any of a variety of Instruction Set Architectures (ISAs), such as the x86, POWERPC®, ARM®, SPARC®, or MIPS® ISAs, or any other suitable ISA.

In the embodiment of FIG. 1, processor(s) 102 includes memory controller 106 that may be implemented directly within the circuitry of processor(s) 102, or memory controller 106 may be a separate integrated circuit that is located on the same die as processor(s) 102. Memory controller 106 may be configured to manage the transfer of data to and from the system memory 104 of IHS 100 via high-speed memory interface 108. System memory 104 coupled to processor(s) 102 provides processor(s) 102 with a high-speed memory that may be used in the execution of computer program instructions by processor(s) 102. Accordingly, system memory 104 may include memory components, such as static RAM (SRAM), dynamic RAM (DRAM), NAND Flash memory, suitable for supporting high-speed memory operations by processor(s) 102. In certain embodiments, system memory 104 may combine both persistent, non-volatile memory and volatile memory. In certain embodiments, system memory 104 may include multiple removable memory modules.

IHS 100 utilizes chipset 110 that may include one or more integrated circuits that are connected to processor(s) 102. In the embodiment of FIG. 1, processor(s) 102 is depicted as a component of chipset 110. In other embodiments, all of chipset 110, or portions of chipset 110 may be implemented directly within the integrated circuitry of processor(s) 102. Chipset 110 provides processor(s) 102 with access to a variety of resources accessible via bus 112. In IHS 100, bus 112 is illustrated as a single element. Various embodiments may utilize any number of separate buses to provide the illustrated pathways served by bus 112.

In various embodiments, IHS 100 may include one or more I/O ports 114 that may support removeable couplings with various types of external devices and systems, including removeable couplings with peripheral devices that may be configured for operation by a particular user of IHS 100. For instance, I/O ports 114 may include USB (Universal Serial Bus) ports, by which a variety of external devices may be coupled to IHS 100. In addition to or instead of USB ports, I/O ports 114 may include various types of physical I/O ports that are accessible to a user via the enclosure of IHS 100.

In certain embodiments, chipset 110 may additionally utilize one or more I/O controllers 116 that may each support the operation of hardware components such as user I/O devices 118 that may include peripheral components physically coupled to I/O port 114 and/or peripheral components that are wirelessly coupled to IHS 100 via network interface 120. In various implementations, I/O controller 116 may support the operation of one or more user I/O devices 118 such as a keyboard, mouse, touchpad, touchscreen, microphone, speakers, camera and other input and output devices that may be coupled to IHS 100. User I/O devices 118 may interface with an I/O controller 116 through wired or wireless couplings supported by IHS 100. In some cases, I/O controllers 116 may support configurable operation of supported peripheral devices, such as user I/O devices 118.

As illustrated, a variety of additional resources may be coupled to processor(s) 102 of IHS 100 through chipset 110. For instance, chipset 110 may be coupled to network interface 120 that may support different types of network connectivity. IHS 100 may also include one or more Network Interface Controllers (NICs) 122 and 124, each of which may implement the hardware required for communicating via a specific networking technology, such as wireless local area network (e.g., Wi-Fi®), Ethernet and mobile cellular networks (e.g., CDMA, TDMA, LTE), and, in accordance with various embodiments of the present systems and methods, short-range wireless technology (e.g., Bluetooth®) (i.e., Wireless Personal Area Network (WPAN)). Network interface 120 may support network connections by wired network controllers 122 and wireless network controllers 124. Each network controller 122 and 124 may be coupled via various buses to chipset 110 to support different types of network connectivity, such as the network connectivity utilized by IHS 100.

As illustrated, IHS 100 may support integrated display device 126, such as a display integrated into a terminal, laptop, tablet, 2-in-1 convertible device, or mobile device. IHS 100 may also support use of one or more external displays 128, such as external monitors that may be coupled to IHS 100 via various types of couplings, such as by connecting a cable from the external display 128 to external I/O port 128 of the IHS 100. One or more display devices 126 and/or 128 coupled to IHS 100 may utilize LCD, LED, OLED, or other display technologies. Each display device 126 and 128 may be capable of receiving touch inputs such as via a touch controller that may be an embedded component of display device 126 and/or 128 or graphics processor 130, or it may be a separate component of IHS 100 accessed via bus 112. In some cases, power to graphics processor 130, integrated display device 126 and/or external display 128 may be turned off or configured to operate at minimal power levels in response to IHS 100 entering a low-power state (e.g., standby). Chipset 110 may provide access to one or more display device(s) 126 and/or 128 via graphics processor 130. Graphics processor 130 may be included within a video card, graphics card or within an embedded controller installed within IHS 100. Additionally, or alternatively, graphics processor 130 may be integrated within processor(s) 102, such as a component of a system-on-chip (SoC). Graphics processor 130 may generate display information and provide the generated information to one or more display device(s) 126 and/or 128, coupled to IHS 100.

Chipset 110 also provides processor(s) 102 with access to one or more storage devices 132. In various embodiments, storage device 132 may be integral to IHS 100 or may be external to IHS 100. In certain embodiments, storage device 132 may be accessed via a storage controller that may be an integrated component of the storage device. Storage device 132 may be implemented using any memory technology allowing IHS 100 to store and retrieve data. For instance, storage device 132 may be a magnetic hard disk storage drive or a solid-state storage drive. In certain embodiments, storage device 132 may be a system of storage devices, such as a cloud system or enterprise data management system that is accessible via network interface 120.

As illustrated, IHS 100 also includes Basic Input/Output System (BIOS) 134 that may be stored in a non-volatile memory accessible by chipset 110 via bus 112. Upon powering or restarting IHS 100, processor(s) 102 may utilize BIOS 134 instructions to initialize and test hardware components coupled to the IHS 100. BIOS 134 instructions may also load an OS (e.g., WINDOWS, MACOS, iOS, ANDROID, LINUX, etc.) for use by IHS 100. BIOS 134 provides an abstraction layer that allows the operating system to interface with the hardware components of the IHS 100. The Unified Extensible Firmware Interface (UEFI) was designed as a successor to BIOS. As a result, many IHSs utilize UEFI in addition to or instead of a BIOS. As used herein, BIOS is intended to also encompass UEFI. IHS firmware (UEFI or BIOS), or the like, may enable a user to configure a "boot order." The IHS will try to boot from a first indicated device, and if this fails, the IHS will attempt to boot from the next indicated device, etc.

As illustrated, certain IHS 100 embodiments may utilize sensor hub 136 capable of sampling and/or collecting data from a variety of hardware sensors 138. Sensors may provide access to data describing environmental and operating conditions of IHS 100 (e.g., accelerometers, gyroscopes, hinge sensors, rotation sensors, hall effect sensors, temperature sensors, voltage sensors, current sensors, IR sensors, photosensors, proximity sensors, distance sensors, magnetic sensors, microphones, ultrasonic sensors, etc.). Generally, in various implementations, processor 102 may receive and/or produce context information using sensors 138 including one or more of, for example: a user's presence state (e.g., present, near-field, mid-field, far-field, absent), a facial expression of the user, a direction of the user's gaze, a user's gesture, a user's voice, an IHS location (e.g., based on the location of a wireless access point or Global Positioning System), IHS movement (e.g., from an accelerometer or gyroscopic sensor), lid state (e.g., of a laptop), hinge angle (e.g., in degrees), IHS posture (e.g., laptop, tablet, book, tent, and display), whether the IHS is coupled to a dock or docking station, a distance between the user and at least one of: the IHS, the keyboard, or a display coupled to the IHS, a type of keyboard (e.g., a physical keyboard integrated into IHS 100, a physical keyboard external to IHS 100, or an on-screen keyboard), whether the user operating the keyboard is typing with one or two hands (e.g., holding a stylus, or the like), a time of day, software application(s) under execution in focus for receiving keyboard input, whether IHS 100 is inside or outside of a carrying bag, ambient lighting, a battery charge level, whether IHS 100 is operating from battery power or is plugged into an AC power source (e.g., whether the IHS is operating in AC-only mode, DC-only mode, or AC+DC mode), a power consumption of various components of IHS 100 (e.g., CPU 102, GPU 130, system memory 104, etc.), an operating temperature of components of IHS 100, such as CPU temperature, memory module temperature, etc. In certain embodiments, sensor hub 136 may be an independent microcontroller or other logic unit that is coupled to the motherboard of IHS 100. Sensor hub 136 may be a component of an integrated system-on-chip incorporated into processor 102, and it may communicate with chipset 110 via a bus connection such as an Inter-Integrated Circuit (I2C) bus or other suitable type of bus connection. Sensor hub 136 may also utilize an I2C bus for communicating with various sensors supported by IHS 100.

As illustrated, IHS 100 may utilize embedded controller (EC) 140, which may be a motherboard component of IHS 100 and may include one or more logic units. In certain embodiments, EC 140 may operate from a separate power plane from the main processors 102 and thus the OS operations of IHS 100. Firmware instructions utilized by EC 140 may be used to operate a secure execution system that may include operations for providing various core functions of IHS 100, such as power management, management of operating modes in which IHS 100 may be physically configured and support for certain integrated I/O functions. In some embodiments, EC 140 and sensor hub 136 may communicate via an out-of-band signaling pathway or bus 124.

In various embodiments, IHS 100 may not include each of the components shown in FIG. 1. Additionally, or alternatively, IHS 100 may include various additional components in addition to those that are shown in FIG. 1. Furthermore, some components that are represented as separate components in FIG. 1 may in certain embodiments instead be integrated with other components. For example, in certain embodiments, all or a portion of the functionality provided by the illustrated components may instead be provided by components integrated into the one or more processor(s) 102 as an SoC.

A person of ordinary skill in the art will appreciate that IHS 100 is merely illustrative and is not intended to limit the scope of the disclosure described herein. In particular, any computer system and/or device may include any combination of hardware or software capable of performing certain operations described herein. In addition, the operations performed by the illustrated components may, in some embodiments, be performed by fewer components or distributed across additional components. Similarly, in other embodiments, the operations of some of the illustrated components may not be performed and/or other additional operations may be available.

A person of ordinary skill will recognize that IHS 100 of FIG. 1 is only one example of a system in which the certain embodiments may be utilized. Indeed, the embodiments described herein may be used in various electronic devices, such as network router devices, televisions, custom telecommunications equipment for special purpose use, etc. That is, certain techniques described herein are in no way limited to use with the IHS of FIG. 1.

"Intelligent connectivity," and the like, may include multi-disciplinary features focused on intelligent optimizations in connectivity, based on key features, profiles and usage models. Short-range wireless technology (e.g., Bluetooth®) (i.e., Wireless Personal Area Network (WPAN)) devices are increasingly prevalent in such environments. Thus, while embodiments herein are generally related to IHSs, embodiments are more specifically related to managed automatic paring ("auto-pair"), and particularly, to Information Technology (IT) managed automatic paring. Embodiments of the present (IT) managed automatic paring allow users to use short-range wireless peripherals, particularly short-range wireless peripherals trusted and/or approved by IT administrators. Thereby, allowing (only) approved, or limited, short-range wireless peripherals to be connected to
client devices (e.g., IHSs, wireless docking station ("wire-
less dock,") etc.). Embodiments of the present managed
automatic paring enables Information Technology Decision
Maker (ITDM) configuration of commercial short-range
wireless peripheral devices and allows for automatic pairing
of the peripheral devices with the provisioned IHS, without
any user intervention.

Figure 2:
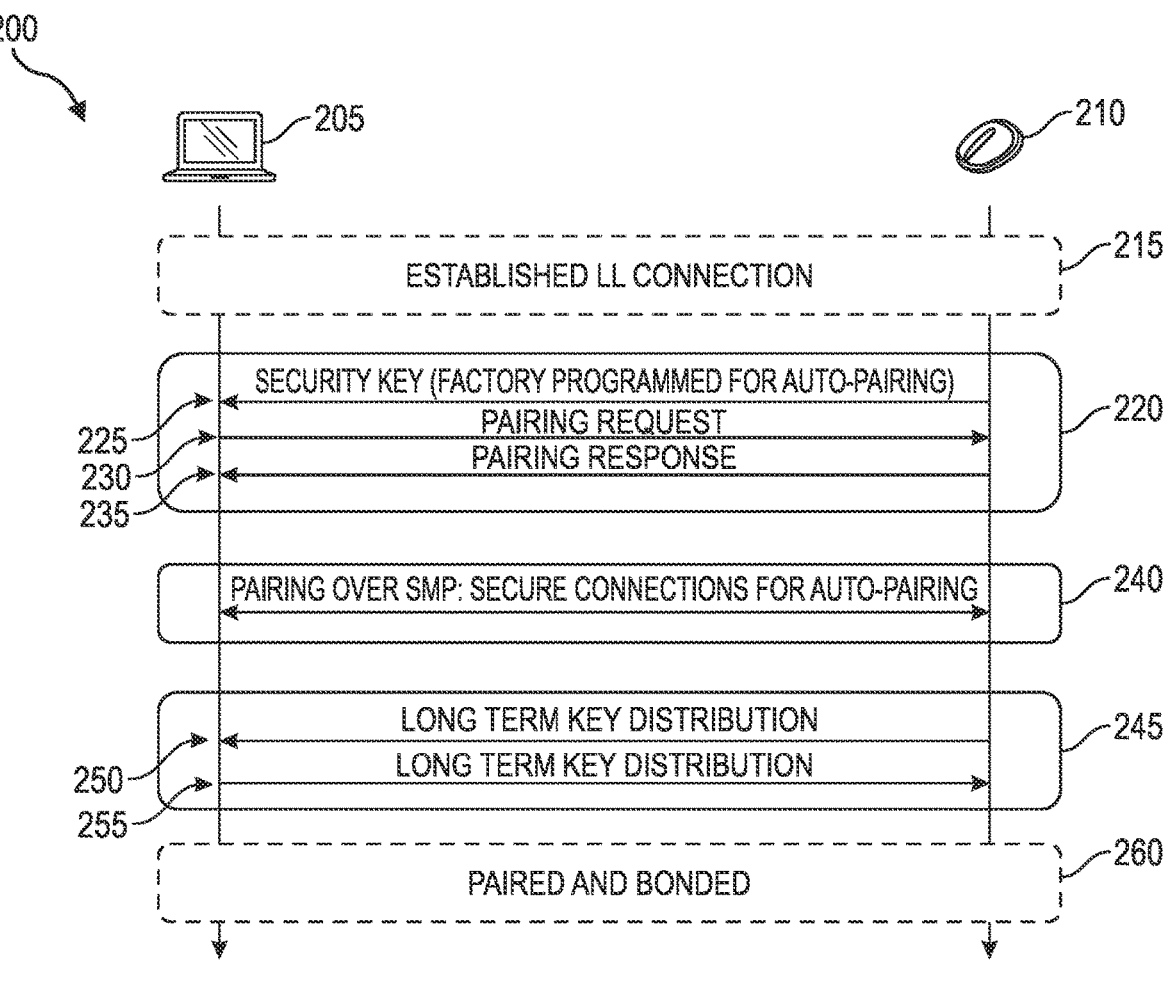
FIG. 2 is a diagram automatic pairing process used in managed automatic paring, according to some embodiments.

Embodiments of the present managed automatic paring
may leverage typical automatic paring, such as the Bluetooth® "Auto Connection Establishment procedure,"
wherein devices pair when within range of each other. For
example, when an IHS approaches (i.e., comes within range)
of a wireless dock, or where a peripheral (e.g., a mouse) is
brought into range of an IHS or vice versa (the IHS (e.g., a
laptop) is brought into range of the peripheral (e.g., printer,
monitor, mouse, etc.)) the devices automatically pair. FIG. 2
is a diagram of such a typical automatic pairing process
(200) (such as may be used at 440, below). Therein, a secure
auto-pairing process is initiated (i.e., started) when, as noted,
devices (e.g., IHS 205 and peripheral (mouse) 210) are in
short-range wireless (e.g., Bluetooth®) range, then a product
specific pairing key is sent by peripheral device 210 to IHS
205 to establish a secure link for pairing key distribution.
Thus, at 215, a Link Layer (LL) connection is established,
such as through device paging and discovery, being per-
formed through short-range wireless procedures, such as
standard Bluetooth® Low Energy (BLE) procedures, and
accurate device ranging is used to start the automatic pairing
process.

Then, at 220 devices 205 and 210 exchange authentica-
tion requirements and I/O capabilities, such as in a BLE
pairing feature exchange. More specifically, a security key,
such as may be factory-programmed for automatic pairing,
is sent by peripheral 210 to IHS 205, at 225. In response IHS sends a paring request to peripheral 210, at 230. In turn,
peripheral 210 sends a paring response to IHS 205, at 235.
The pairing request (230) and response (235) may include
I/O ability, an Out of Band (OOB) data flag, a security
request (AuthReq), maximum encryption key size (Max Enc
Key), initialization key (Int Key) distribution, response key
(Resp Key) distribution, and/or the like.

Then at 240, pairing over a Bluetooth® Security Manager
Protocol (SMP) is carried out to establish secure connections
for auto-pairing. Therein, security key generation is carried
out at 240, such as Long Term Key (LTK) generation (or
Short Term Key (STK) generation).

Then, at 245, an encrypted connection is established with
the keys generated at 240 through transport specific key
distribution. Therein, the LTK (or STK) generated at 240 is
distributed from peripheral 210 to IHS 205 at 250 and from
IHS 205 to peripheral 210, at 255. Resulting, at 260 IHS 205
and peripheral 210 are paired and bonded. Once paired and
bonded at 260 RF power for both the client (IHS 205) and
peripheral device 210 is restored to default levels and device
210 works with IHS 205, within normal short-range wireless
(e.g., Bluetooth®) range.

In embodiments of (IT) managed automatic paring, short-
range wireless (e.g., Bluetooth®) (peripheral) devices are
configured to add an advertisement packet to a short-range
wireless device advertisement. In embodiments, a managing
Information Handling System (IHS) may: detect and parse
out the advertisement packet from the advertisement, pair
with the device; generate a short-range wireless device
identifier using the advertisement packet; store the device
identifier on the managing IHS and the device, to establish
a device pair identity for the device; and transfer the device identifier to a target IHS, to assign the device to the target
IHS and provision the target IHS to automatically pair with
the device. The managing IHS may then delete resulting
pairing information. In embodiments, the target IHS may
detect and parse out the advertisement packet from the
advertisement, confirm that the target IHS is provisioned to
automatically pair with the device, request a pairing passkey,
and initiate secure pairing with the device.

As noted, embodiments of the present managed automatic
paring may make use of a short-range wireless advertise-
ment. Under short-range wireless standards (e.g., Blu-
etooth®) a peripheral device may send either connectable
and scannable undirected advertising events or connectable
undirected advertising events. In accordance with embodi-
ments of the present managed automatic paring, an extra
short-range wireless device advertisement (i.e., an ADV)
packet is added to customize a standard short-range wireless
device advertisement. An example of an embodiment of an
ADV packet is shown in FIG. 5 and discussed below. The
ADV packet may be generally unique, and may be factory
provisioned, or it may be random, such as generated by a
secure Random Number Generator (RNG) block on the BLE
chipset, or the like. The existence of the ADV packet and its
size can be included in the preamble of the short-range
wireless advertisement packet to optimize a short-range
wireless scan rate and/or short-range wireless scan window.
The extra ADV packet can be indicated in an Extended
Advertisement Indicator, such as a BLUETOOTH Extended
ADV Indicator (ADV_EXT_IND), and the extra packet can
be added to Extended Auxiliary Advertisement (AUX_AD-
V_IND) Protocol Data Unit (PDU) packets, such as dis-
cussed further below with respect to FIG. 6.

Figure 3:
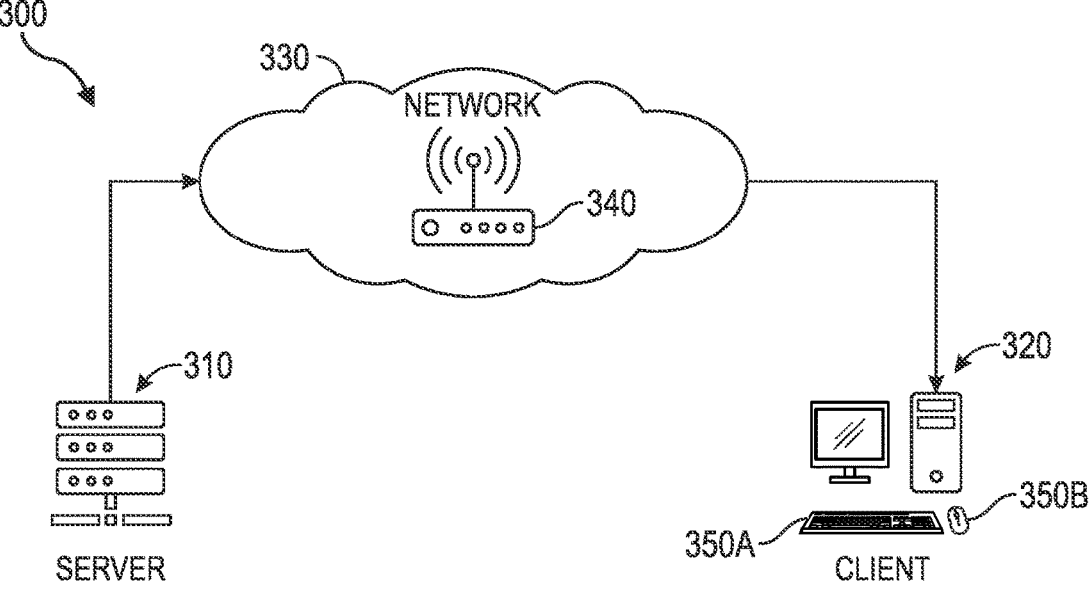
FIG. 3 is a diagram of a managed automatic paring server/client architecture, according to some embodiments.

FIG. 3 is a diagram of managed automatic paring server/
client architecture 300, according to some embodiments,
wherein a secure Device_id is generated by IHS 310 (e.g.,
an ITDM sever) during an ITDM provisioning process and
transferred to target client IHS 320, a wireless dock, or the
like using enterprise network (wired or wireless, as illus-
trated) 330). In managed automatic paring server/client
architecture 300 the information (i.e., the Device_id, etc.)
does not need to leave the enterprise premises, and as
discussed in greater detail above the data (i.e., the Devi-
ce_id, etc.) is automatically generated, and as discussed in
greater detail below, self-destructs. In various embodiments
of the present managed automatic paring a Wi-Fi® certified
Tunneled Direct Link Setup (TDLS) can be used to transfer
the data (i.e., the Device_id, etc.), via enterprise wireless
network 330, via wireless router, network controller, or the
like 340, for secure Device_id provisioning on target IHS
320. TDLS allows for efficient secure data transfer indepen-
dent of the security of network 330 and can be carried out
without any user intervention (i.e., independent of user
input). Peripheral devices 350a, 350b, etc. can maintain their
existing functions and are configured by the ITDM, via IHS
310 (i.e., the ITDM sever) to reconfigure as ITDM managed
devices, as described below. Human Interface Devices
(HIDs) 350a, 350b, etc. are automatically paired and con-
nected with client IHS 320, without any user intervention
(i.e., independent of user input).

Such as in furtherance of the managed automatic paring
server/client architecture described above with respect to
FIG. 3, embodiments of the present managed automatic
paring may make use of an ITDM automatic pair service,
wherein, an ITDM filter driver service running on an ITDM
IHS (e.g., a managing sever) can be used to detect and parse
out the custom ADV packet from a short-range wireless
(e.g., BLE) advertisement of a short-range wireless peripheral device. The ITDM IHS and the short-range wireless peripheral device can go through a secure pairing process to establish a secure link between the two devices. A unique short-range wireless device identifier, referred to herein as a "Device_id," may then be generated using entropy (i.e., randomness) of the custom ADV packet and stored on both the ITDM IHS and short-range wireless device to establish device pair identity of the peripheral device. In accordance with various embodiments of the present managed automatic paring, the ITDM can assign the short-range wireless periph- eral device to a specific IHS, a short-range wireless enabled dock (i.e., a wireless dock), or the like, referred to herein as a "target IHS." The ITDM IHS can transfer the Device_id to the target IHS using a server/client architecture, such as described above, with respect to FIG. 3. The target IHS is, as a result, provisioned to auto pair with the peripheral device and will auto pair when the peripheral device comes in close proximity, without requiring (i.e., performed inde- pendent of) any user intervention. In various embodiments of the present managed automatic paring, once the transfer is complete, the paring information is deleted from the ITDM IHS, and optionally the Device_id can be deleted from the ITDM, as well.

A detailed further below, with respect to the flowchart of FIG. 4, embodiments of the present managed automatic paring may make use of a client auto pair service. Therein, a client filter driver service running on a client IHS (e.g., target 320) can be used to detect and parse out the custom ADV packet from a short-range wireless (e.g., BLE) adver- tisement to determine presence of (a) managed auto pairing peripheral device(s) and determine if the device (target IHS) is provisioned to pair with this (these) peripheral device(s). The client IHS (320) can request a pairing passkey (i.e., a Device_id) (225) from the ITDM auto pair service described above using a connect and manage (COM) Application Program Interface (API). If the passkey is received, the client device (320) will start the secure pairing process (e.g., 200, 215 through 240) and exchange pairing keys (e.g., 245 through 255). Thereby, pairing is completed (260) without any intervention. A notification may be displayed when pairing is completed (see 450, below).

Figure 4:
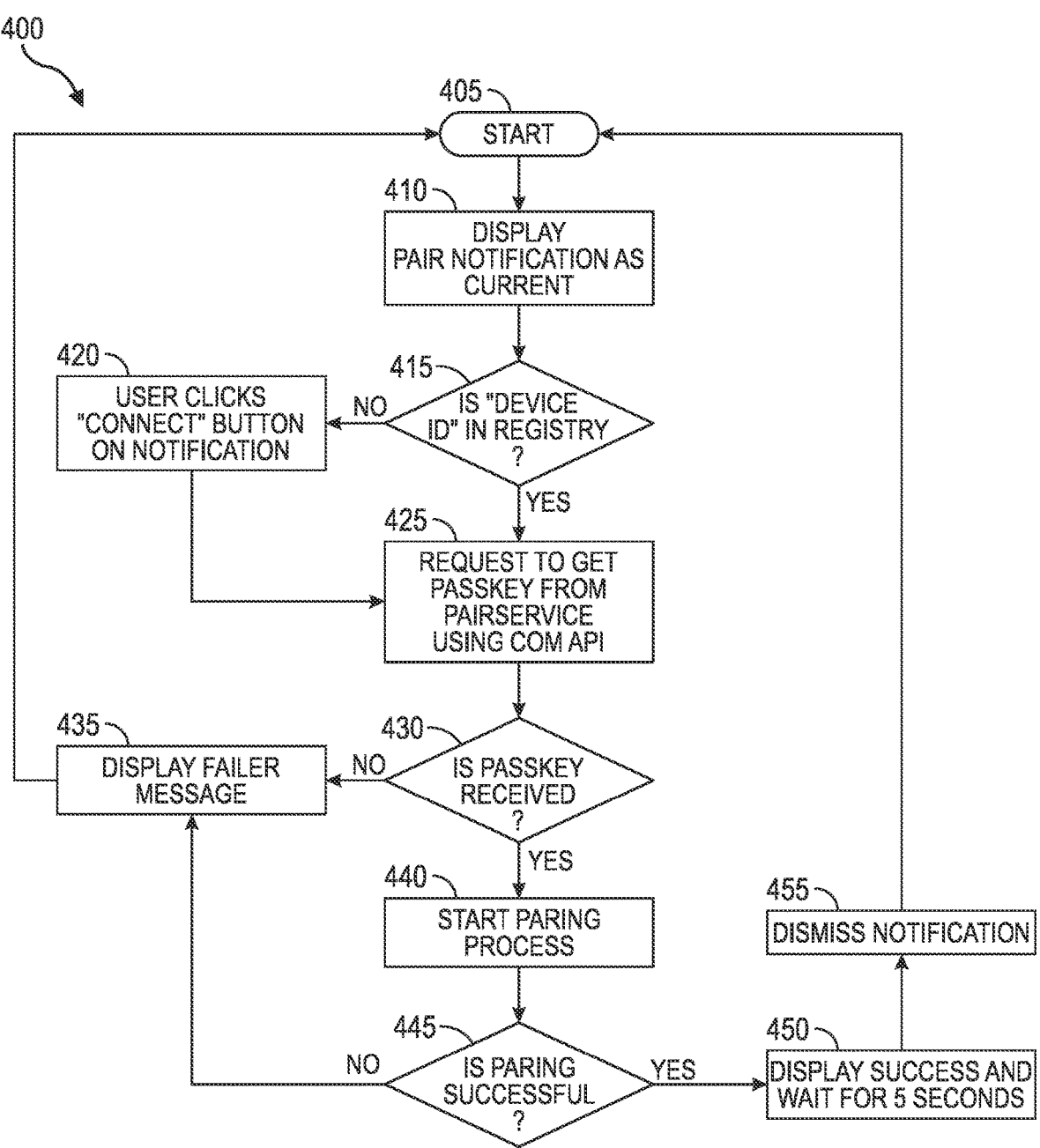
FIG. 4 is a flowchart of a managed automatic paring end-user client IHS automatic pair, according to some embodiments.

FIG. 4 is a flowchart of managed automatic paring end- user client IHS automatic pair 400, according to some embodiments. Upon start of process 400 at 405, a notifica- tion of a current pair status of the IHS, for example what short-range wireless devices are currently paired with the client IHS (and which paired devices are connected to the IHS) is displayed at 410. At 415, a determination is made as to whether a Device_id in an advertisement of a short-range wireless device is in a short-range wireless registry of the IHS. If the Device_id is not in the registry a connect button is displayed in the notification from 410. If the user of the IHS clicks on the connect button in the notification from 410, or if it is determined at 415 that the advertised Devi- ce_id is in the registry, the IHS issues a request to retrieve a PassKey (i.e., Device_id) from a pair service using a COM API, or the like, at 425. At 430, a determination is made as to whether the PassKey has been received, if not, a pair failure message is displayed at 435 and process 400 restarts at 405. If it is determined at 430 that PassKey was received, the paring process (e.g., automatic pairing process 200) starts at 440. Then, at 445 a determination is made as to whether the pairing initiated at 440 is successful, if not, a pair failure message is displayed at 435 and process 400 restarts at 405. However, if it is determined at 445 that the paring initiated at 440 succeeded a message indicating the successful paring is displayed at 45, such as for a specified time, such as five seconds, as illustrated, and/or, until dismissed by the user. In either case the success notification is dismissed at 455 and process 400 restarts at 405, such as for paring another (IT) managed short-range wireless device with the IHS, or the like.

FIG. 5 is an example of advertisement format 500, adapted for use in the present managed automatic paring, according to some embodiments. Advertisement format 500 is shown, whereby target Device_id packet 510 is shown to be packed along with advertisement packets 520 needed for current supported features such as typical short-range wire- less paring (e.g., Bluetooth® pair, Microsoft® Swift Pair, Dell® Pair, and the like). Advertising format 500 is exten- sible by using managed automatic paring custom short-range wireless advertisement delivery 600, discussed below with respect to FIG. 6, or the like.

Figure 6:
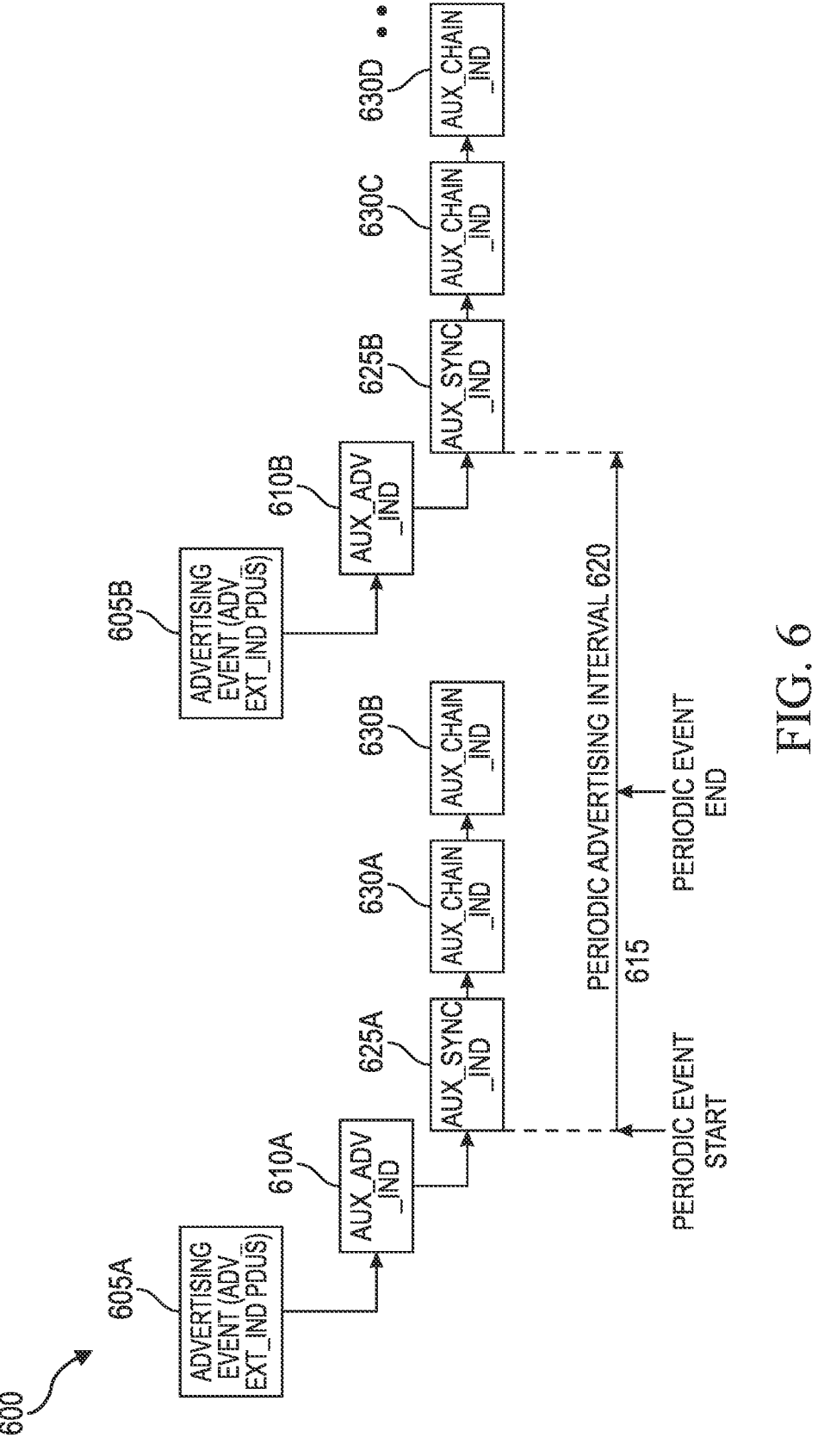
FIG. 6 is a flow diagram of managed automatic paring custom short-range wireless advertisement delivery, according to some embodiments.

FIG. 6 is a flow diagram of managed automatic paring custom short-range wireless advertisement delivery 600, according to some embodiments. Extended short-range wireless advertisements, such as BLE extended advertise- ment, as described below, can be used to send the extra (secure) ADV packet using periodic advertisement with a defined interval chosen during a configuration process. This is not required under embodiments of the present managed automatic paring, this allows for packet size to be increased (e.g., for additional security entropy, flexibility, and the like). The primary advertisement channel is used to transmit, the ADV_EXT_IND PDU type 605a-n, which holds infor- mation (e.g., time offset, Physical Layer (PHY), etc.) that can be used to find AUX_ADV_IND PDU packet 610a-n. That packet, in turn, contains a SyncInfo field which defines the data needed to synchronize to the periodic advertisement packets for a Periodic Event, for example, 615, of a Periodic Advertising Interval, for example, 620. (AUX_SYNC_IND 625a-n and AUX_CHAIN_IND 630a-n) in a way similar to how connections are formed (channel map, hop sequence, which PHY, etc.) in typical Bluetooth® PDUs. Therefore, a scanner can target an advertising device by first discovering the advertisement event on the primary channel, and then tuning into the appropriate secondary channel and timing based on information sent in the primary advertisement packet.

In accordance with the foregoing, embodiments of the present managed automatic paring use dynamic keys in BLE advertisement packets, or the like, to enable ITDM managed auto-pairing of peripheral devices, without any user inter- vention on a client device or the peripheral device. Also, in accordance with some embodiments, auto-deletion of the pairing information once the provisioning information is transferred to the target device may be enabled. In accor- dance herewith, non-constrained custom advertisement size with synchronized advertisement packet information shar- ing, without the need to scan for advertisement channel, may be employed in providing managed automatic paring. Thereby, controlled admission of short-range wireless (e.g., Bluetooth®) devices to managed IT environments may be implemented. That is, in accordance with embodiments herein, peripherals can be "automatically" and "securely" paired with particular client devices (IHS notebooks, IHS desktops, etc.), in an ITDM controlled and/or managed environment, such as through peripheral device firmware implementation of the present embodiments.

It should be understood that various operations described herein may be implemented in software executed by pro- cessing circuitry, hardware, or a combination thereof. The order in which each operation of a given method is per- formed may be changed, and various operations may be added, reordered, combined, omitted, modified, etc. It is intended that the invention(s) described herein embrace all such modifications and changes and, accordingly, the above description should be regarded in an illustrative rather than a restrictive sense.

To implement various operations described herein, computer program code (i.e., instructions for carrying out these operations) may be written in any combination of one or more programming languages, including an object-oriented programming language such as Java, Smalltalk, Python, C++, or the like, conventional procedural programming languages, such as the "C" programming language or similar programming languages, or any of machine learning software. These program instructions may also be stored in a computer readable storage medium that can direct a computer system, other programmable data processing apparatus, controller, or other device to operate in a particular manner, such that the instructions stored in the computer readable medium produce an article of manufacture including instructions which implement the operations specified in the block diagram block or blocks. The program instructions may also be loaded onto a computer, other programmable data processing apparatus, controller, or other device to cause a series of operations to be performed on the computer, or other programmable apparatus or devices, to produce a computer implemented process such that the instructions upon execution provide processes for implementing the implementing the operations specified in the block diagram block or blocks.

Reference is made herein to "configuring" a device or a device "configured to" perform some operation(s). It should be understood that this may include selecting predefined logic blocks and logically associating them. It may also include programming computer software-based logic of a retrofit control device, wiring discrete hardware components, or a combination of thereof. Such configured devices are physically designed to perform the specified operation(s).

Modules implemented in software for execution by various types of processors may, for instance, include one or more physical or logical blocks of computer instructions, which may, for instance, be organized as an object or procedure. Nevertheless, the executables of an identified module need not be physically located together but may include disparate instructions stored in different locations which, when joined logically together, include the module and achieve the stated purpose for the module. Indeed, a module of executable code may be a single instruction, or many instructions, and may even be distributed over several different code segments, among different programs, and across several memory devices. Similarly, operational data may be identified and illustrated herein within modules and may be embodied in any suitable form and organized within any suitable type of data structure. The operational data may be collected as a single data set or may be distributed over different locations including over different storage devices.

The terms "tangible" and "non-transitory," as used herein, are intended to describe a computer-readable storage medium (or "memory") excluding propagating electromagnetic signals; but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including, for example, RAM. Program instructions and data stored on a tangible computer-accessible storage medium in non-transitory form may afterwards be transmitted by transmission media or signals such as electrical, electromagnetic, or digital signals, which may be conveyed via a communication medium such as a network and/or a wireless link.

Unless stated otherwise, terms such as "first" and "second" are used to arbitrarily distinguish between the elements such terms describe. Thus, these terms are not necessarily intended to indicate temporal or other prioritization of such elements. The terms "coupled" or "operably coupled" are defined as connected, although not necessarily directly, and not necessarily mechanically. The terms "a" and "an" are defined as one or more unless stated otherwise. The terms "comprise" (and any form of comprise, such as "comprises" and "comprising"), "have" (and any form of have, such as "has" and "having"), "include" (and any form of include, such as "includes" and "including") and "contain" (and any form of contain, such as "contains" and "containing") are open-ended linking verbs. As a result, a system, device, or apparatus that "comprises," "has," "includes" or "contains" one or more elements possesses those one or more elements but is not limited to possessing only those one or more elements. Similarly, a method or process that "comprises," "has," "includes" or "contains" one or more operations possesses those one or more operations but is not limited to possessing only those one or more operations.

Although the invention(s) is/are described herein with reference to specific embodiments, various modifications and changes can be made without departing from the scope of the present invention(s), as set forth in the claims below. Accordingly, the specification and figures are to be regarded in an illustrative rather than a restrictive sense, and all such modifications are intended to be included within the scope of the present invention(s). Any benefits, advantages, or solutions to problems that are described herein with regard to specific embodiments are not intended to be construed as a critical, required, or essential feature or element of any or all the claims.

The invention claimed is:

1. A method comprising:

adding an advertisement packet to a short-range wireless device advertisement;

detecting and parsing out, by a managing Information handling system (IHS), the advertisement packet from the short-range wireless device advertisement;

pairing, by the managing IHS and the short-range wireless device, establishing a secure link between the managing IHS and the short-range wireless device;

generating a short-range wireless device identifier using the advertisement packet;

storing the short-range wireless device identifier on the managing IHS and the short-range wireless device, establishing a device pair identity of the short-range wireless device;

transferring, by the managing IHS, the short-range wireless device identifier to a target IHS, assigning the short-range wireless device to the target IHS, provisioning the target IHS to automatically pair with the short-range wireless device;

detecting and parsing out, by the target IHS, the advertisement packet from the short-range wireless device advertisement;

confirming, by the target IHS, that the target IHS is provisioned to automatically pair with the short-range wireless device;

requesting, by the target IHS, a pairing passkey; and initiating, by the target IHS, secure pairing with the short-range wireless device upon receipt of the passkey.

2. The method of claim 1, wherein the detecting and parsing out, by the target IHS, the advertisement packet from the short-range wireless device advertisement , determines presence of the short-range wireless device.

3. The method of claim 1, wherein the short-range wireless device is a short-range wireless peripheral device.

4. The method of claim 1, wherein the target IHS is a personal IHS or a wireless docking station.

5. The method of claim 1, wherein the advertisement packet is unique or random, generated by a random number generator of the short-range wireless device.

6. The method of claim 1, further comprising including an indicator of the advertisement packet in a preamble of the short-range wireless device advertisement.

7. The method of claim 1, further comprising including an indicator of the advertisement packet in an extended advertisement indicator and adding the advertisement packet to extended auxiliary advertisement protocol data unit packets.

8. The method of claim 1, wherein generating the short-range wireless device identifier using the advertisement packet further comprises generating the short-range wireless device identifier using entropy of the advertisement packet.

9. The method of claim 1, wherein the target IHS automatically pairs with the short-range wireless device when the short-range wireless device comes within a short-range wireless range of the target IHS.

10. The method of claim 1, further comprising deleting resulting short-range wireless pairing information from the managing IHS following transferring of the short-range wireless device identifier to the target IHS.

11. A managed automatic pairing system comprising:

short-range wireless devices configured to add an advertisement packet to a short-range wireless device advertisement;

a managing Information Handling System (IHS) comprising:

a managing IHS processor; and a managing IHS memory coupled to the managing IHS processor, the managing IHS memory having managing IHS program instructions stored thereon that, upon execution by the managing IHS processor, cause the managing IHS to:

detect and parse out the advertisement packet from the short-range wireless device advertisement;

pair with the short-range wireless device, establishing a secure link with the short-range wireless device;

generate a short-range wireless device identifier using the advertisement packet;

store the short-range wireless device identifier on the managing IHS and the short-range wireless device, establishing a device pair identity of the short-range wireless device; and transfer the short-range wireless device identifier to a target IHS, assigning the short-range wireless device to the target IHS and provision the target IHS to automatically pair with the short-range wireless device, wherein the target IHS comprises:

a target IHS processor; and a target IHS memory coupled to the target IHS processor, the target IHS memory having target IHS program instructions stored thereon that, upon execution by the target IHS processor, cause the target IHS to: detect and parse out the advertisement packet from the short-range wireless device advertisement; confirm that the target IHS is provisioned to automatically pair with the short-range wireless device; request a pairing passkey; and initiate secure pairing with the short-range wireless device upon receipt of the passkey.

12. The managed automatic pairing system of claim 11, wherein the managing IHS program instructions comprise information technology decision maker filter driver service program instructions.

13. The managed automatic pairing system of claim 11, wherein the target IHS program instructions comprise client filter driver service program instructions.

14. The managed automatic pairing system of claim 11, wherein the short-range wireless device is a short-range wireless peripheral device.

15. The managed automatic pairing system of claim 11, wherein the target IHS is a personal IHS or a wireless docking station.

16. The managed automatic pairing system of claim 11, wherein the advertisement packet is unique or random generated by a random number generator of the short-range wireless device.

17. The managed automatic pairing system of claim 11, wherein the short-range wireless device is further configured to include an indicator of the advertisement packet in an extended advertisement indicator and add the advertisement packet to extended auxiliary advertisement protocol data unit packets.

18. The managed automatic pairing system of claim 11, wherein, upon execution by the managing IHS processor, the managing IHS program instructions further cause the managing IHS to delete resulting pairing information from the managing IHS following transfer of the short-range wireless device identifier to the target IHS.

19. The managed automatic pairing system of claim 11, wherein the detecting and parsing out the advertisement packet from the short-range wireless device advertisement determines presence of the short-range wireless device.

* * * * *